United States Patent [19]

Meguro et al.

[11] 4,422,746

[45] Dec. 27, 1983

[54] AUTO FOCUS CAMERA

[75] Inventors: Hiroshi Meguro, Kawasaki; Nobuo Okabe, Narita Higashi, both of Japan

[73] Assignee: Nippon Kogaku K.K., Tokyo, Japan

[21] Appl. No.: 299,788

[22] Filed: Sep. 4, 1981

[30] Foreign Application Priority Data

Sep. 11, 1980 [JP]  Japan ............................ 55-129675[U]

[51] Int. Cl.³ ............................................. G03B 13/18
[52] U.S. Cl. ............................................... 354/195.12
[58] Field of Search .................. 354/25 R, 25 N, 195, 354/198

[56] References Cited

U.S. PATENT DOCUMENTS 4,318,598  3/1982  Fukuhara et al. .................. 354/198
4,319,820  3/1982  Ostrowski et al. ................. 354/195
4,326,783  4/1982  Kawamura et al. ................ 354/198

Primary Examiner—Russell E. Adams

Attorney, Agent, or Firm—Fitzpatrick, Cella, Harper & Scinto

[57] ABSTRACT

In a camera having a phototaking lens capable of manual focusing operation by an operating ring and automatic focusing operation by a drive control device responsive to the output of an in-focus detecting device and wherein the manual focusing operation and the automatic focusing operation can be selectively accomplished by means of a change-over operating device, there are provided display means capable of displaying information on the in-focus condition of the phototaking lens in response to the output of the in-focus detecting device, focus lock means operable to restrain the movement of the phototaking lens at any position related to the focusing operation of the phototaking lens and at the same time fix the display by the display means, and means for blocking the operation of the focus lock means in response to the selection of the manual focusing operation by the change-over operating device.

6 Claims, 6 Drawing Figures

AUTO FOCUS CAMERA

BACKGROUND OF THE INVENTION

1. Field of the Invention

This invention relates to an auto focus camera capable of selecting an automatic focusing mode in which a phototaking lens is automatically directed to its in-focus position by a driving device and a manual focusing mode in which the phototaking lens is directed to its in-focus position by manual operation.

2. Description of the Prior Art

It is convenient to provide the above-described auto focus camera with a display device for displaying whether the phototaking lens is in its in-focus condition and to display the condition of the phototaking lens by such display device both in automatic focusing mode and manual focusing mode.

Further, if a focus lock device is provided in the camera having such a display device so that after the phototaking lens has been focused to a particular object in automatic focusing mode, this focus lock device is operated to stop the driving of the phototaking lens by a drive device and to fix the display by the aforementioned display device, the phototaking lens will not be moved and the display will not change even if the camera is moved thereafter to change the composition and therefore, the degree of freedom of photography will be greatly improved and photogtaphy will be more convenient.

However, if, in such a camera, the focus lock device is inadvertently operated in manual focusing mode and the display by the display device is fixed, the display will not change even if the operator has moved the phototaking lens by manual operation. This may lead to an undesirable possibility that even when the phototaking lens is not actually in its in-focus condition, the operator will incorrectly believe that the phototaking lens is in its in-focus condition.

SUMMARY OF THE INVENTION

It is an object of the present invention to eliminate the above-noted disadvantage and to provide an auto focus camera in which when manual focusing mode is selected, an improper display may not be effected by operation of the focus lock device.

The camera of the present invention renders the focus lock device inoperable in the manual focusing mode and causes the display device for displaying whether the phototaking lens is in its in-focus condition to accurately display the condition of the manually operated phototaking lens.

The invention will become more fully apparent from the following detailed description of some embodiments thereof taken in conjunction with the accompanying drawings.

DESCRIPTION OF THE PREFERRED EMBODIMENTS

Figure 1:
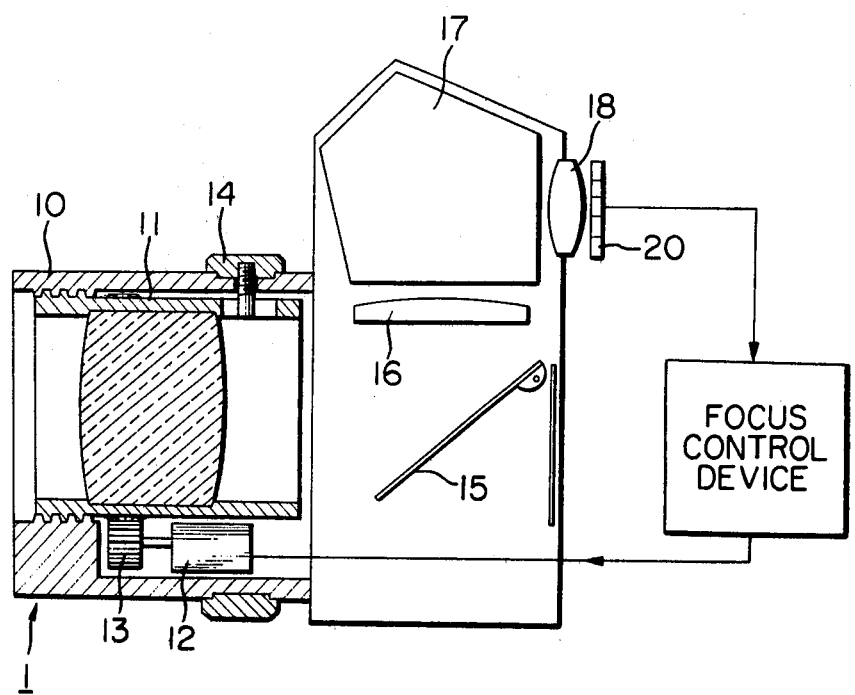
FIG. 1 is a cross-sectional view schematically showing the camera according to an embodiment of the present invention.

Referring to FIG. 1, a phototaking lens 1 has a movable cylinder 11 threadedly engaged with a fixed barrel 10 and rotatable by a motor 12 and a drive gear 13 and movable in the direction of the optical axis while holding a focusing lens, the movable cylinder 11 being rotatable and movable in the direction of the optical axis by a distance ring 14 rotatably provided on the outer periphery of the fixed barrel 10. The light beam passed through the phototaking lens is reflected by a movable reflecting mirror 15 and imaged on a focusing screen 16 and further directed through a pentaprism 17 to a finder eyepiece. A photoelectric element array 20 is disposed at the re-imaged position of an object image on the focusing screen by a re-imaging lens 18 and the output thereof is transmitted to a focusing control device.

Figure 2:
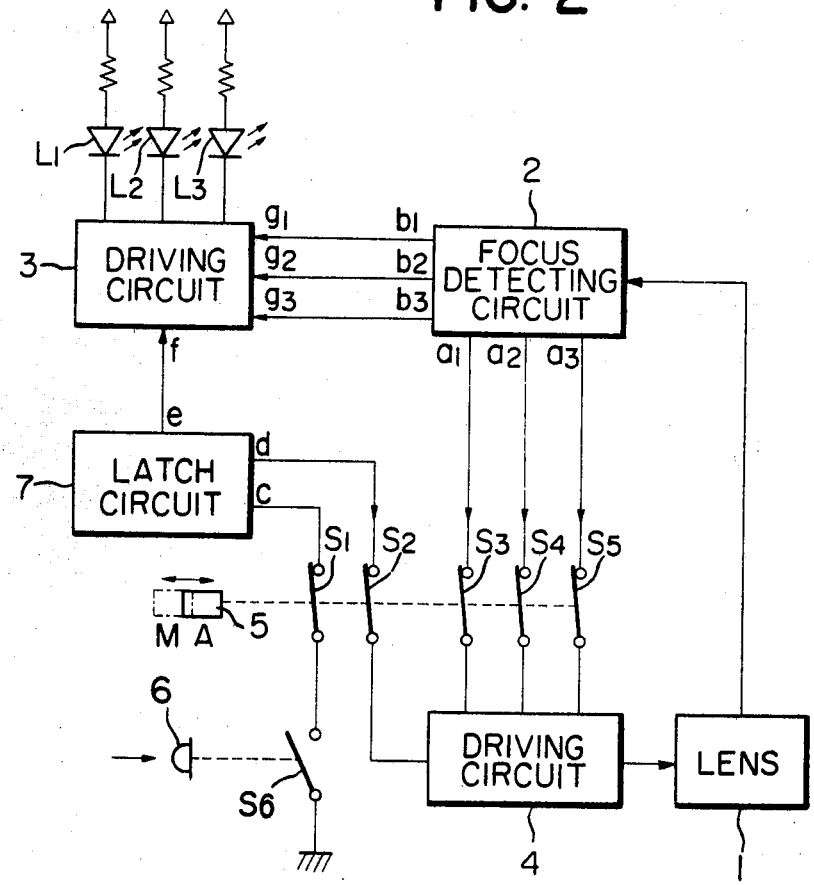
FIG. 2 is a block diagram showing a first embodiment of the present invention.

FIG. 2 shows the electric circuit of a camera including the focusing control device. A focus detecting circuit 2 is a circuit as shown, for example, in Japanese Laid-open Patent Application No. 98709/1980 (U.S. application Ser. No. 109,282 filed Jan. 3, 1980) which receives the output from the photoelectric element array 20 to detect the in-focus condition of the phototaking lens with respect to the object to be photographed, and discriminates between the front focus condition in which the image position lies on the object side with respect to the focal plane of the phototaking lens, the rear focus condition in which the image position lies on the opposite side from the object with respect to the focal plane, and the in-focus condition in which the image position lies on the focal plane. A drive circuit 3 controls the turn-on of three LED's $L_1$–$L_3$. A drive circuit 4 is a circuit as shown, for example, in U.S. application Ser. No. 167,912 filed July 11, 1980 which controls normal revolution, reverse revolution and sudden stop of the motor 12. A change-over operating member 5 slideoperably provided externally of the camera is for selecting one of an automtic focusing mode in which the phototaking lens 1 is directed to its in-focus position by the drive force of the aforementioned motor and a manual focusing mode in which the phototaking lens 1 is directed to its in-focus position by manual operation. Switches S1–S5 are opened and closed in response to the change-over operating member 5. Switch S6 is opened and closed in response to a focus lock button 6 operably provided on the camera or the phototaking lens. A latch circuit 7 is operable by operation of the focus lock button 6.

Operation of the present embodiment will now be described. Switches S1–S5 are closed when the change-over operating member 5 has selected the automatic focusing mode as shown in FIG. 2. The detecting circuit 2 discriminates whether the phototaking lens 1 is in front focus condition or rear focus condition or in-focus condition and, when the phototaking lens 1 is in front focus condition, and produces a high level output at a terminal a1 and the lens driving circuit 4 revolves the motor 12 in the normal direction. The motor moves the movable cylinder 11 in the direction of the optical axis so that the phototaking lens 1 assumes its in-focus condition. When the phototaking lens 1 is in rear focus condition, the detecting circuit 2 produces a high level output at a terminal a2 and the lens driving circuit 4 revolves the motor in the reverse direction. The motor moves the movable cylinder 11 in the direction opposite to that in the case of the aforementioned front focus so that the phototaking lens 1 assumes its in-focus condition. When the in-focus condition is obtained in this manner, the detecting circuit 2 produces a high level output at a terminal a3 and the lens driving circuit 4 short-circuits and stops the motor. With the stop of the motor, the phototaking lens 1 stops at its in-focus position.

Figure 4:
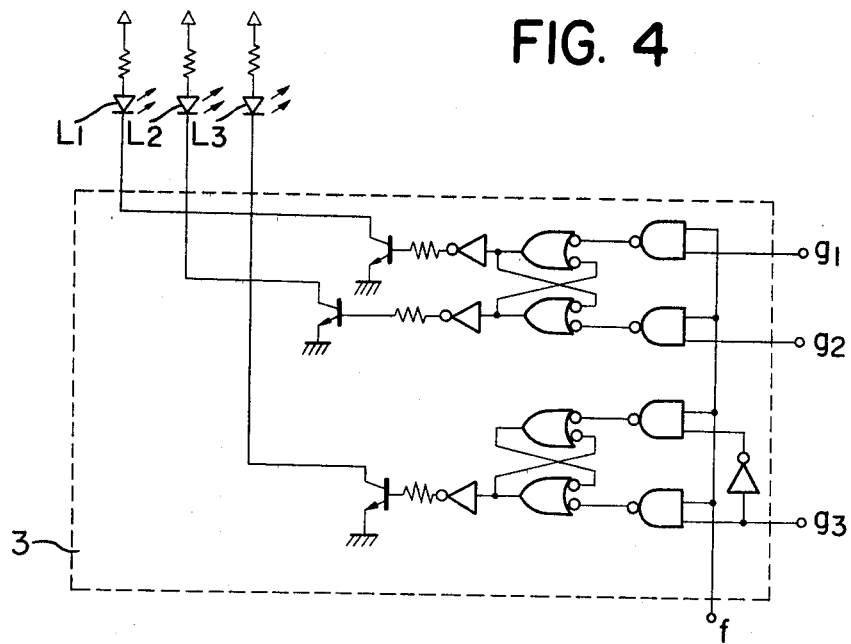
FIG. 4 is a diagram of the specific electric circuit of a drive circuit 3 in the first and second embodiments.

Outputs coincident with the terminals a1, a2 and a3 are produced at the terminals b1, b2 and b3, respectively, of the detecting circuit 2. The drive circuit 3 receives the outputs from the terminals b1, b2 and b3 and selectively turns on the LED's $L_1$, $L_2$ and $L_3$. That is, in front focus condition, the signal from the terminal b1 is transmitted to the drive circuit 3, which thus turns on the LED $L_1$. In rear focus condition, the circuit 3 turns on the LED $L_2$ by the signal from the terminal b2. In in-focus condition, the circuit 3 turns on the LED $L_3$ by signal from terminal b3. Thus, the condition of the phototaking lens 1 is displayed within the finder by selective turn-on of the LED's $L_1$–$L_3$. As the drive circuit 3, use is made, for example, of the circuit as shown in FIG. 4.

Figure 5:
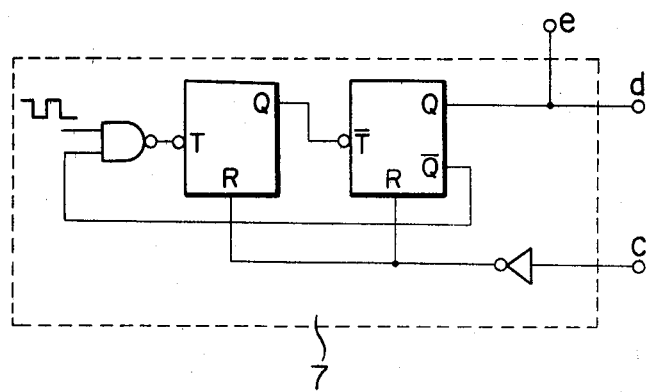
FIG. 5 is a diagram of the specific electric circuit of a latch circuit 7 in the first embodiment.

Description will now be made of a case where focus lock is effected when the above-described automatic focusing mode is selected. When the focus lock button 6 is depressed in the condition of FIG. 2, the switch S6 is closed and a signal is transmitted to the terminal c of the latch circuit 7. The latch circuit 7 produces a signal from a terminal d to the lens driving circuit 4 and the motor in the driving circuit 4 is short-circuited and stopped. At the same time, the latch circuit 7 produces a signal from a terminal e to the drive circuit 3 and the LED's $L_1$, $L_2$ and $L_3$ are fixed in their display conditions immediately before that. That is, when the lock button 6 is depressed, the phototaking lens 1 is stopped and the LED's $L_1$, $L_2$ and $L_3$ are fixed. As the latch circuit 7, use is made, for example, of the circuit as shown in FIG. 5. As long as the focus lock button 6 is depressed, the switch S6 remains closed and therefore, this condition is maintained. Accordingly, even if the focus lock button 6 is depressed with the phototaking lens 1 focused to a certain object and thereafter the camera is moved so that this object lies outside the distance measurement range in the center of the photographing picture plane, the phototaking lens 1 is not driven by the driving circuit 4 and further, the display device displays that the phototaking lens 1 is focused to said object.

Description will now be made of the operation when the manual focusing mode has been selected. When the change-over operating member 5 is manually operated so as to move from its solid-line position of FIG. 2 to its broken-line position, the switches S1–S5 are opened. Accordingly, the signal from the focus detecting circuit 2 is not transmitted to the driving circuit 4. When, in this condition, the distance ring 14 of the phototaking lens 1 is manually operated, the focusing lens is moved in the direction of the optical axis in accordance with the rotation of the distance ring. The drive circuit 3 receives the signal from the focus detecting circuit 2 and selectively turns on the LED's $L_1$, $L_2$ and $L_3$, and displays within the finder in what condition the phototaking lens 1 is.

With the manual focusing mode having been selected, the switches S1–S5 are opened and therefore, even if the focus lock button 6 is depressed by mistake to close the switch S6, the closing signal of the switch S6 is not transmitted to the latch circuit 7 and accordingly, no signal is put out from the terminals d and e of the latch circuit 7 and the LED's $L_1$, $L_2$ and $L_3$ are not fixed through the drive circuit 3. Accordingly, the condition of the phototaking lens varied by the distance ring 14 is accurately displayed by the LED's $L_1$, $L_2$ and $L_3$. In this manner, display is not fixed even if the focus lock button 6 is depressed.

Figure 3:
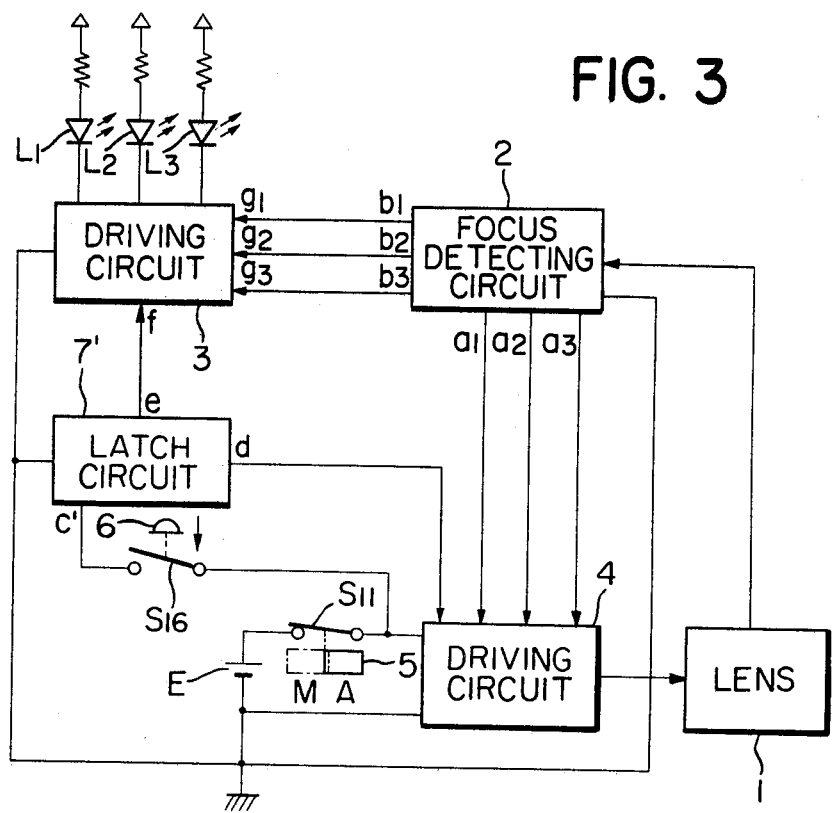
FIG. 3 is a block diagram showing a second embodiment of the present invention.

Reference is now had to FIG. 3 to describe a second embodiment of the present invention.

Figure 6:
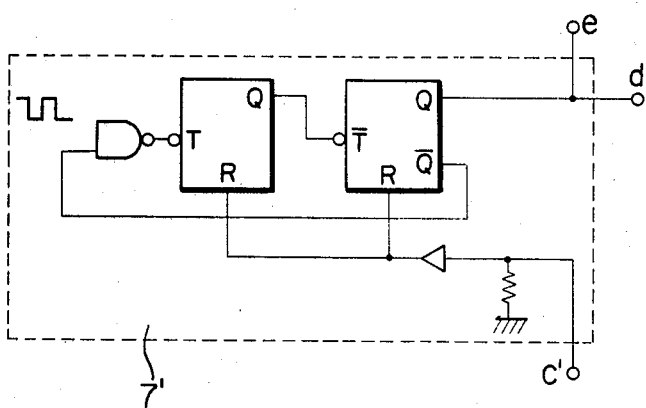
FIG. 6 is a diagram of the specific electric circuit of a latch circuit 7' in the second embodiment.

The device of FIG. 3 has a switch S11 operatively associated with the manual change-over operating member 5 and a switch S16 operatively associated with the focus lock button 6. This device is in the condition of FIG. 3 when the change-over operating member 5 selects the automatic focusing mode. When the focus lock button 6 is depressed, the switch S16 is closed and the voltage of a power source E is applied to the latch circuit 7' through a terminal c'. Thus, the latch circuit 7' produces signals from terminals d and e as in the case of the first embodiment and the driving circuit 4 shortcircuits and stops the motor while, at the same time, the drive circuit 3 fixes the display by LED's $L_1$, $L_2$ and $L_3$. This condition is maintained as long as the focus lock button 6 is depressed. As the latch circuit 7', use is made, for example, of the circuit as shown in FIG. 6.

When the change-over operating member 5 is operated so as to move froms its solid-line position to its broken-line position and select the manual focusing mode, the switch S11 is opened to cut off the power supply from the power source E to the driving circuit 4. Accordingly, the driving circuit 4 no longer controls the phototaking lens 1 by the signal from the focus detecting circuit 2. When, in this condition, the distance ring of the lens barrel is rotatively operated, the focusing lens is moved in the direction of the optical axis and the drive circuit 3 receives the signal from the focus detecting circuit 2 and selectively turns on the LED's $L_1$, $L_2$ and $L_3$. Even if, in this condition, the focus lock button 6 is depressed to close the switch S16, the voltage of the power source E is not applied to the latch circuit 7' and the drive circuit 3 accurately displays the condition of the phototaking lens.

As still another embodiment of the present invention, a restraining portion capable of entering into the movement locus of the focus lock button 6 during the sliding operation of the change-over operating member 5 to the manual focusing mode may be provided on the member 5 to thereby block the depression of the button 6.

We claim:

1. A photographic camera comprising:
   (a) a phototaking lens having a focusing lens system controlled to focus on a focal plane an image of an object to be photographed;
   (b) means for detecting the focusing state of said image on said focal plane and producing a detecting signal representing the focusing state;
   (c) means for displaying the focusing state in response to the detecting signal;
   (d) first operating means provided in said phototaking lens and manually operable to control the focusing lens system;
   (e) second operating means having electric driving means responding to the detecting signal and electrically operable to control said focusing lens;

(f) first restraining means operable to disable response of the display means and the electric driving means to said detecting signal; and (g) second restraining means operable to disable response of the electric driving means to said detecting means, the second restraining means having means for disabling operation of the first restraining means during operation of the second restraining means.

2. A photographic camera according to claim 1, wherein said first restraining means include a manually operable member, switching means associating with the manually operable member, and a latch circuit for generating an electric output for fixing to a state just before thereof the display means and the electric driving means in response to the switching means.

3. A photographic camera according to claim 2, wherein said second restraining means include a further manually operable member and further switching means associated with said further manually operable member, said further switching means being connected in series with the first mentioned switching means and being made non-conductive to disable said first restraining means.

4. A photographic camera comprising:
(a) a phototaking lens having a focusing lens system controlled for focusing an image of the object to be photographed on a focal plane;
(b) means for detecting the focusing state of said image on said focal plane and producing a detecting signal representing the focusing state;
(c) means for effecting display with respect to the focusing state in response to the detecting signal;
(d) first operating means provided in said phototaking lens and manually operated for controlling said focusing lens system;
(e) second operating means having an electric driving means responsive to said detecting signal and electrically operable to control said focusing lens system;
(f) means for effecting energization of the display means and the electric driving means to fix to a state just before the energization of the display by the display means and the control of said focusing lens system;
(g) means for impeding the energization by the energizing means; and
(h) means for disabling the response of said electric driving means to said detecting signal in response to the impeding means.

5. A photographic camera comprising:
(a) a phototaking lens having a focusing lens system controlled for focusing an image of the object to be photographed on a focal plane;
(b) means for detecting the focusing state of said image on said focal plane and producing a detecting signal representing the focusing state;
(c) means for displaying the focusing state in response to the detecting signal;
(d) an electric motor for driving the focusing lens system to control the focusing lens system;
(e) a driving circuit for controlling rotation of the electric motor in response to the detecting signal;
(f) latch means for effecting generation of a restraining signal for holding to a state just before the energization of the display means and the driving circuit, the latch means including a switch circuit which includes a first operating switch and a second operating switch and generating a trigger signal when both the first and second operating switches are conductive, and a latch circuit for generating said restraining signal upon receipt of the trigger signal; and
(g) means associated with said first operating switch to disable said driving circuit when said first operating switch is non-conductive.

6. A photographic camera according to claim 5, wherein said first and second operating switches are connected in series.

* * * * *